United States Patent [19]
von Allwörden et al.

[11] Patent Number: 5,326,319
[45] Date of Patent: Jul. 5, 1994

[54] DEVICE FOR PREPARATION OF STRAW MATERIALS

[75] Inventors: Wilhelm von Allwörden, Oberstotzingen; Martin Häfele, Adelmannsfelden, both of Fed. Rep. of Germany

[73] Assignee: Klöckner-Humboldt-Deutz AG, Cologne, Fed. Rep. of Germany

[21] Appl. No.: 956,847

[22] Filed: Oct. 2, 1992

[30] Foreign Application Priority Data

Oct. 2, 1991 [DE] Fed. Rep. of Germany ....... 4132759

[51] Int. Cl.⁵ .............................................. A01F 12/40
[52] U.S. Cl. ................................... 460/119; 460/150; 56/16.4; 100/162 R
[58] Field of Search .................. 460/74, 76, 119, 149, 460/150; 56/16.4; 100/162 R, 163 R

[56] References Cited

U.S. PATENT DOCUMENTS 2,038,708  4/1936  Bert ................... 100/162 R
3,780,646  12/1973  Ancellin ............ 100/162 R
4,407,111  10/1983  Brune et al. ......... 56/16.4

FOREIGN PATENT DOCUMENTS 0456095  4/1949  Canada ............... 100/162 R

OTHER PUBLICATIONS

American Society of Agricultural Engineers, Kraus et al., Jun. 1990, Paper #901054.

Primary Examiner—Terry Lee Melius
Attorney, Agent, or Firm—Charles L. Schwab

[57] ABSTRACT

A device with which mowed straw material is prepared, that is, broken up into fibers, in order to speed up the drying process. In order to create a compact device that effectively prepares the straw material, there is an aggregate 3 provided with a central roll 5, to which there are assigned planetary rolls 6, 7 arranged around part of the outer circumference and rotating in the opposing direction, and the straw material is led into the clearance zone between the planetary rolls 6, 7 and the central roll 5. In order to improve preparation, the central roll 5, as well as the planetary rolls 6, 7, are provided with a surface structure matched to one another. The aggregate 3 comprises all components necessary for preparation and can be pre-assembled and installed in a grass-matting machine in vibration-isolated fashion via the elastic support 20.

28 Claims, 5 Drawing Sheets

DEVICE FOR PREPARATION OF STRAW MATERIALS

TECHNICAL FIELD

This invention relates to a device with which cut straw material is broken up into fibers to speed up the drying process.

PRIOR ART STATEMENT

German patent document in DE-OS 19 62 777, there can be found the design of a harvesting machine that comprises a device for the mowing of the straw material, after which there is connected a takeup drum, which leads the cut straw material to a conveying device, from which it passes into a straw material preparation device. Said device is formed by means of a drum, which exhibits evenly spaced teeth on the outer circumference. Nearly half the circumference of the drum is enclosed by a so-called pan. The preparation of the straw material takes place in the following way: Said straw material is guided into the gap between the drum and the pan, the drum rotating at a high speed and picking up the straw material, preparing it, that is, breaking it up into fibers, and subsequently guiding it to a compression device connected thereafter.

In ASAE Paper No. 901054, on page 10, FIG. 1, there can be found the schematic design of a grass-matting machine, which exhibits, among other things, a device for the preparation of straw material, see page 10, FIG. 2, which is essentially formed by means of a roll to which, in the installed condition, there are assigned a plurality of rolls exhibiting a smaller diameter, arranged in planetary fashion in an almost semicircular arrangement. For preparation, the straw material passes into the region between the central roll and the planetary rolls, which are driven in mutually opposite senses and consequently convey the admitted straw material forward, said straw material thereby being prepared.

OBJECTS AND BRIEF SUMMARY OF THE INVENTION

It s an object of the invention to improve the degree of preparation of the device of the type stated, to achieve effective protection against foreign objects, as well as to create a device that can be employed in an easy-to-assemble and pre-installed fashion.

The design of the device provides for a central roll to which, in the installed condition, planetary rolls are assigned in the upper region and which is connected to a brush roll at bottom. Common to all rolls is the axially parallel arrangement and support in side walls located at either end of the rolls. The side walls are mounted in a frame and, together, form an aggregate that can be employed in pre-installed fashion, for example in a grass-matting machine. This design advantageously promotes the maintenance as well as the accessibility of individual components in the case of a required repair and thereby enhances the availability of the whole machine.

In accordance with the invention, for the improvement of the degree of straw material preparation, the surfaces of the central roll and of the planetary rolls are structured so that, to the extent possible, every straw of the straw material admitted into the device is prepared, that is, broken up into fibers.

On the basis of the design and the installed position of the device, the cut straw material intended for preparation is led into the partial annular clearance to the spacing between the planetary rolls and the central roll, which clearance is located in the region of the upper circumference of the central roll. Serving for the controlled introduction of the straw material into the inlet of the partial annular clearance is the brush roll mounted below the central roll in the installed position, a further task of which brush roll consists in separating foreign objects, such as for example stones, metal parts or other objects, from the straw material in order to avoid damage to the device. Because of the straight-line conveyance of the straw material to the device by means of feeding organs, there occurs a nearly right-angle deflection of the straw material before inlet to straw material preparation. After the end of the elevator, the foreign objects also conveyed by the elevator along with the straw material thus pass into the zone beneath the central roll because they have a higher specific weight than the straw material, and said foreign objects can pass through this region virtually unhindered, since for this purpose the brushes of the brush roll arranged below the central roll allow the passage of these objects.

Serving to drive the device in accordance with the invention is, for example, a belt drive with which the central roll is driven, from which central roll the planetary rolls are driven via two further chain drives arranged at the ends of the central roll. In place of a chain drive, the use of a belt drive, in particular toothed-belt drive, is likewise a possibility. Alternatively, a gear drive can further find use, as also a hydraulic drive.

Serving to create a large wrap angle of the drive chain or drive belt, respectively, on the individual sprocket wheels or belt pulleys on the planetary rolls is a split drive of the planetary rolls on alternate sides, that is, the driving of adjacent planetary rolls is effected alternately from the end of one end of the central roll or the other end of the central roll.

For the better introduction of the straw material into the partial annular clearance of the device, there is provided at the inlet of the preparation a planetary roll whose diameter is larger than the diameter of all the other planetary rolls, which are sized identically to one another. In order to create an equal peripheral speed of all planetary rolls, the planetary roll exhibiting a larger diameter is provided with a larger drive wheel.

In an embodiment of the invention, it may be advantageous to design the peripheral speed of the individual planetary rolls in continuously increasing fashion, beginning from the inlet to the discharge, for example by replacing appropriate drive wheels, in order to improve the degree of preparation.

By way of dealing with the increasing density of the straw material, the spacing in the partial annular clearance between the central roll and the planetary rolls is increasingly variably adjustable between the inlet and the discharge, that is, the spacing is advantageously adjusted diminishingly toward the discharge.

In an advantageous embodiment of the invention, there is a central adjustment of the spacing, by which means all the planetary rolls are adjustable at the same time. In order to simplify operation, further, a servo-assisted remote adjustment can be provided. Further, it is a possibility to provide the remote adjustment with an indicating device by means of which the instantaneous spacing can be seen by the operator at any time.

As a further measure for the effective control of the degree of preparation by means of the device in accordance with the invention, there is a spacing adjustment in dependence on the throughput of straw material. By means of suitable monitoring organs or sensors, the instantaneous throughput of straw material is measured and, in dependence thereon, an adjustment of the spacing is performed by control organs.

The design of the device in accordance with the invention likewise provides elastic support of all planetary rolls with maintenance of the specified spacing. This support, with which the planetary rolls can deflect radially, additionally serves to protect the device in case a foreign object passes into it, as well as also to avoid plugging or blocking of the device in accordance with the invention in case of a momentary heavier loading with straw material. An advantageous possibility is to provide the support with a variable spring pre-tension in order to control the frequency of the deflection of individual planetary rolls. A variable-length drive of the planetary rolls, provided for example with a tensioning roll, serves to create elastic support of all planetary rolls.

As a result of tests, the following spacing between the central roll and the planetary rolls has proved advantageous: between 1 and 20 mm in the inlet region and between 0 and 5.0 mm in the region of the discharge. The spacing varies continuously between inlet and discharge.

Tests have further shown that the ratio of the peripheral speeds between the central roll and the planetary rolls is of great importance for the degree of preparation. A ratio of 1.1:1 to 2:1 has proved advantageous.

A range of 5 to 35 m/s should be regarded as the optimal peripheral speed for the central roll as well as for the brush roll.

The preparation of the straw material, that is, the fanning out of individual straws, can advantageously be further increased by providing the central roll and all planetary rolls with fluting. What is more, the fluting effects self-cleaning of the rolls. For this purpose, both longitudinal fluting parallel to the axis and fluting that exhibits a helical pattern (twist) can be used. A value of 0.1 to 20% has proved favorable as a twist for helical fluting. A range of 0.5 to 10 mm has been determined to be advantageous as the pitch for both flutings. Satisfactory preparation of the material is achievable by means of flutings that exhibit a profile angle between 35° and 90°.

A flattening of the outer region of the fluting serves to reduce wear of the fluting, a flattening between 0.1 and 2 mm being provided.

The design of the device in accordance with the invention provides recesses arranged in radiating fashion toward the midpoint of the central roll, in which recesses the individual planetary rolls are guided and their support is mounted.

In embodiment of the invention, for the effective deflection of the straw material into the inlet of the preparation device, the brush roll is driven in the same sense of rotation as the central roll. The brush roll is provided with flexible brushes on the outer circumference, by means of which flexible brushes a gentle deflection of the stray material is possible, and which, in case prepared straw material is carried along by means of the central roll, furthermore advantageously removes such material from the central roll. Further, separation of foreign objects from the straw material is achieved by means of the brush roll, which foreign objects, because they have a higher specific weight than the straw material, is not carried along by said straw material when the straw material is deflected after leaving the feeder or elevator, but is conveyed forward in arc fashion beneath the central roll, as if thrown, and thus can pass through the brush zone of the brush roll virtually unhindered. The arrangement of the brush roll is further arranged in position-variable fashion, in particular vertically adjustable, in order to insure the effectiveness of the brush roll even in case of wear of the flexible brushes, that is, reduced outside diameter, by means of displacing the brush roll toward the central roll.

In a further embodiment of the device in accordance with the invention, elastic support is provided for the entire aggregate. In this way, first, the disadvantageous transmission of vibrations that are initiated by the aggregate to the driver's position of the machine is avoided and, second, there is no disadvantageous transmission of frame distortions of the vehicle, in particular grass-matting machine, to the aggregate for straw material preparation.

The maintenance and repair accessibility of the device for straw material preparation is decisively improved by means of the design as a unit in the form of an aggregate that comprises all components of the straw material preparation. In pursuance of these ideas, it is further thought to make the aggregate usable as a unit in a straw cutter or in a grass-matting machine, said aggregate being elastically supported.

A number of planetary rolls between 1 and 10 has proved advantageous for the design of the device in accordance with the invention. A range between 50 and 400 mm has proved favorable as the diameter for the planetary rolls and from 200 to 900 mm for the central roll.

A variety of parameters must be considered as design parameters for the central roll and the planetary rolls. The number of planetary rolls as well as the diameter and also the peripheral speed of all rolls can be selected within specified ranges in dependence on the straw material to be prepared and the degree of preparation.

BRIEF DESCRIPTION OF THE DRAWINGS

An exemplary embodiment which contributes to the further explanation of the invention, can be found in the Drawings as well as the description of Figures that follows.

DETAILED DESCRIPTION OF THE DRAWINGS

The fundamental design of the device is further elucidated by means of the Figures. All components belonging to the device are compactly assembled into a unit and, together, form the aggregate 3. The aggregate 3, which can be used for example in a grass-matting machine, is provided with a centrally arranged central roll 5, to which, in the installed position, there are assigned a plurality of planetary rolls in the upper region of the outer circumference extending to near the central roll 5. In the region of the inlet 10 is the planetary roll 6, which exhibits a larger diameter than all other planetary rolls 7, by which means a better deflection and introduction of the straw material into the device is insured. The spacing X between the planetary rolls 6, 7 and the central roll 5 is adjusted decreasingly, beginning from the inlet 10, continuously up to the discharge 11. The spacing X is adjustable so that this device in accordance with the invention can be used for various cereals and also so that it can be adapted to the throughput. A central adjustment can be used in order to improve operation. Each planetary roll 6, 7 is supported and guided in a recess 18, the suspension being designed so that, if a foreign object is inlet into the aggregate 3, every planetary roll can deflect radially in order to avoid damage and thus failure of the device. One possibility for this purpose is to arrange the individual planetary rolls 6, 7 in adjustable, elastic fashion. As the drive for the aggregate 3 there is a central drive, effected via belts 14, which drive connects a prime mover, not illustrated, of the grass-matting machine or any other machine in which the aggregate 3 in accordance with the invention is used, to the belt pulley 21 located on the central roll 5. Via a sprocket wheel 22 attached to the central roll 5 parallel to the belt pulley 21, the total of six planetary rolls are driven in groups of three from either end of the central roll 5 via a chain drive that comprises, among other things, a pair of endless flexible drive means or drive chain belts 13, (one at each of the opposite ends of the rolls). With the splitting of the planetary roll drive, the drive chain belt 13 is made to contact the individual drive wheels of the planetary rolls around a greater wrap angle. By this means, adjacent planetary rolls exhibit a drive at alternating ends. The elastically loaded tensioning roll 12 is further connected to the chain drive, with which tensioning roll the drive chain belt 13 is pre-tensioned, and which further advantageously increases the wrap angle of the drive chain belt 13 on the sprocket wheel 22 on account of the position of the tensioning roll 12. The chain belt drives provided at either end of the central roll are designed such that the sense of rotation is opposing between the planetary rolls 6, 7 and the central roll 5. In place of the belt and chain drive described, the device can also be driven with a gear drive as also with a hydraulic drive. Located below the central roll 5 is the brush roll, which is provided with brushes 9. The brush roll 8, driven in the same sense of rotation as the central roll 5, serves to deflect the straw material into the inlet 10 of the device. The brushes 9 of the brush roll 8 perform, furthermore, the task of guarding against stones. The straw material fed to the aggregate for preparation is led to the device via feed organs, not illustrated, whose direction of conveyance essentially coincides with the position of the drive belt 14 shown in FIG. 1. In the region of the inlet 10, the straw material experiences a nearly right-angle deflection, which is not completed by objects having a specific weight differing from, that is, higher than, the straw material, on account of inertia. These objects pass onto the brush roll 8 and are conveyed forward by said brush roller to the side of the brush roll 8 facing the tensioning roll 12, and there accelerated and received in, for example, a collecting vessel, not illustrated. On account of the elastic brushes 9, damage to the central roll 5 by means of stones or other objects when they pass through the contact zone between the central roll 5 and the brush roll 8 is avoided. What is more, the brush roll 8 performs the task of cleaning entrained prepared straw material from the outer circumference of the central roll 5. The support 23 of the brush roll 8 is adjustable in order to insure the effectiveness of the brush roll in case of wear, attrition of the brushes 9. The aggregate 3 is enclosed by the frame 15, which is essentially formed by means of the side walls 16, 17 in which the rolls are guided and supported, as well as the load-bearing elements that connect the side walls 16, 17, which load-bearing elements are not illustrated in FIGS. 1 and 2. Elastic support 20 is provided in order to achieve the most vibration-free possible installation of the aggregate 3.

MODE OF OPERATION OF THE DEVICE

Figure 1:
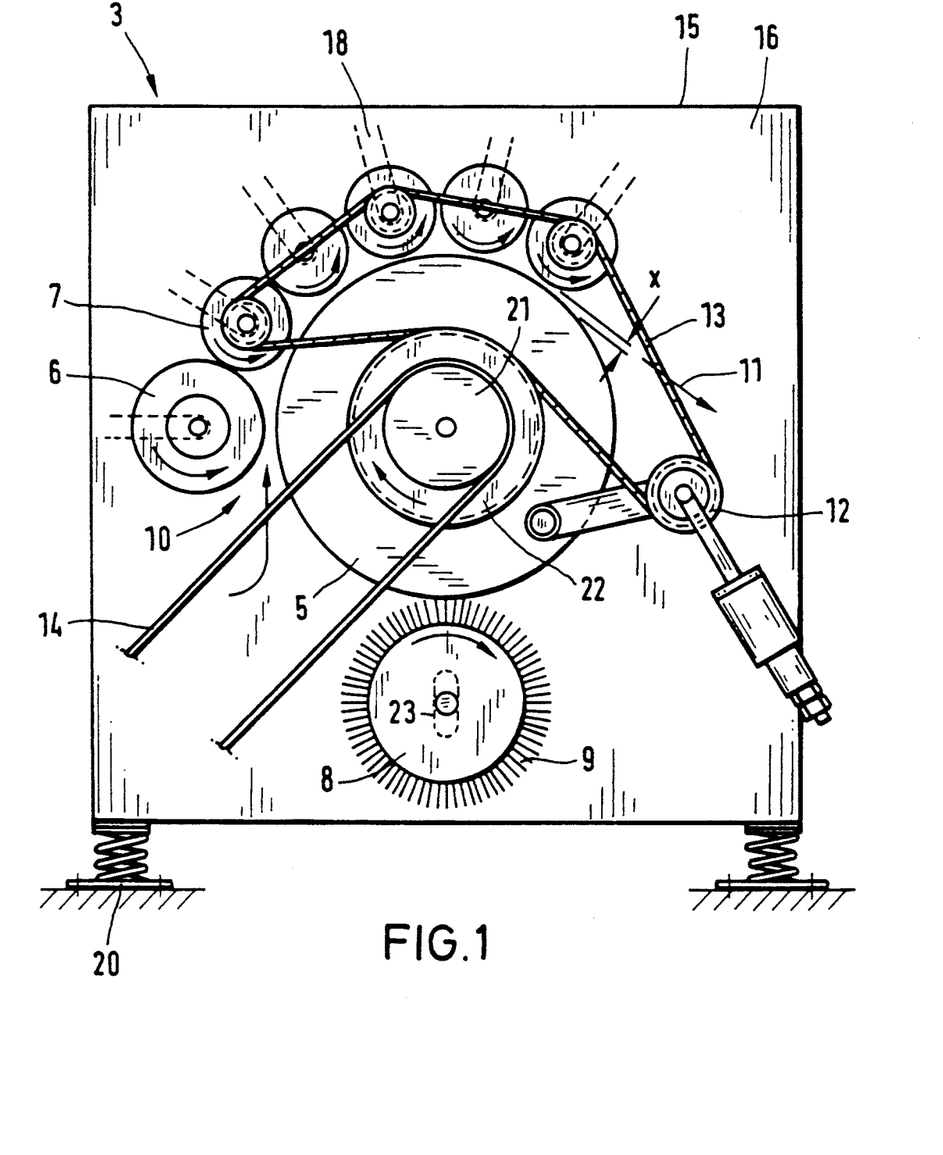
FIG. 1 shows, in a lateral view, the schematic design of the device for preparation of straw materials in accordance with the invention.
Figure 2:
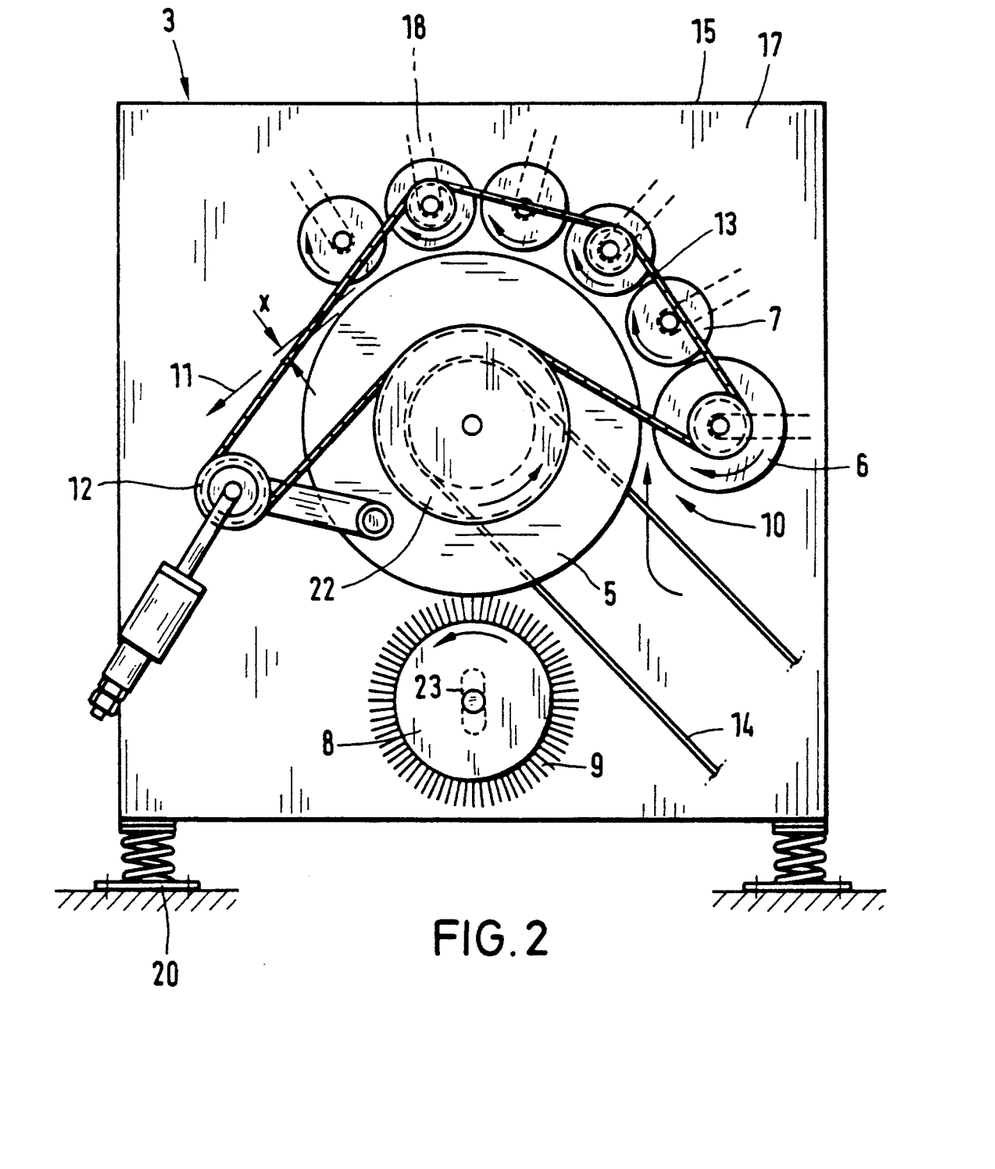
FIG. 2 shows the opposite end of the device shown in FIG. 1.

The straw material fed to the aggregate 3 passes into the spacing X that is formed by the planetary roll 6 arranged a distance away from the central roll 5. The straw material is conveyed on account of the contrary sense of rotation between the central roll 5 and all planetary rolls 6, 7. The spacing X between the planetary rolls 6, 7 and the central roll 5, which spacing decreases continuously from the inlet 10 to the discharge 11, effects a steady compaction of the straw material over the circumference of the central roll 5 in the conveyance direction and is largely adapted to the varying, that is, reduced cross section due to the compaction of the straw material. The breaking up into fibers of individual straws of the straw material intended for preparation is reinforced by a drive of the rolls that provides a difference in peripheral speed between the central roll 5 and the planetary rolls 6, 7. The introduction of the straw material is improved by means of a planetary roll 6 located at the inlet 10 and designed larger in circumference. It may be advantageous for this purpose to design the peripheral speed of the planetary roll 6 higher than that of the planetary rolls 7. The mowed straw material, conveyed in essentially a right-angle fashion onto the central roll 5, is deflected into the inlet region of the device with the aid of the brush roll 8. The prepared material leaves the device via the discharge 11 and is fed to further organs connected thereafter in the grass-matting machine. The degree of preparation can be further improved by providing the outer circumference of the central roll 5 and of the planetary rolls 6, 7 with knurlings whose cross-sectional surface resembles a triangle. These knurlings, made parallel to the axis or helically on the outer circumference of the rolls, improve the conveying action and the degree of preparation. What is more, the fluting results in a certain self-cleaning effect of the rolls.

Figure 3:
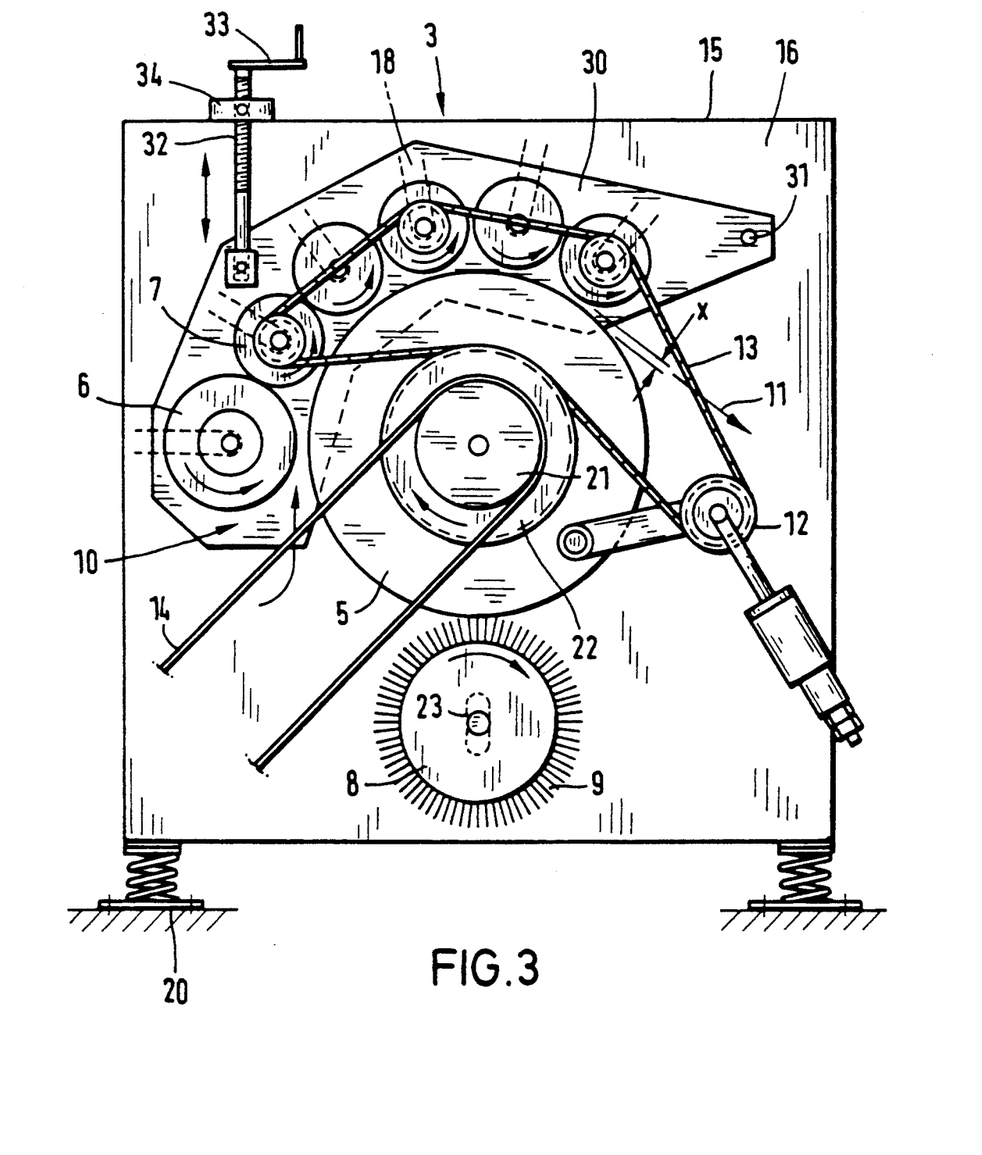
FIG. 3 shows the device of FIG. 1 in accordance with the invention, which is provided with a central adjustment for all planetary rolls.

FIG. 3 shows an adjusting unit or mechanism with which all planetary rolls 6, 7 can be centrally adjusted, that is, the spacing X can be varied. For this purpose, a segment 30 is provided at either end of the aggregate 3, which segment is connected to the support of the planetary rolls 6, 7 and is pivotable about a center 31. A threaded spindle 32 permits the accurate adjustment of the spacing X, said spindle being, first, attached to the end of the segment 30 opposite the center 31 and, second, screwed into the spindle nut 34 on the frame 15. The crank 33 on the free end of the threaded spindle 32, that is, on the end that protrudes out of the spindle nut 34, serves to rotate the threaded spindle.

Figure 4:
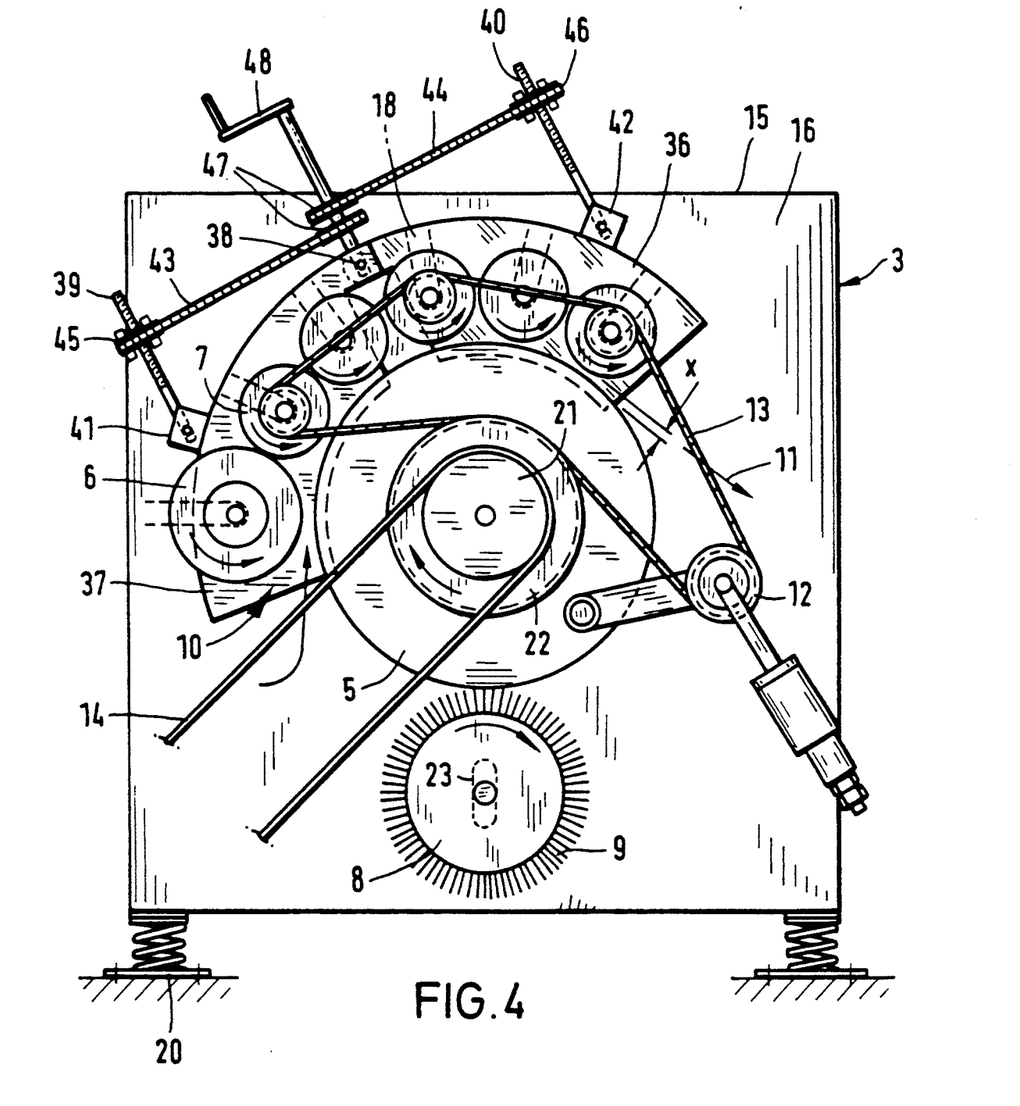
FIG. 4 shows a proposed solution for the central adjustment as an alternative to that shown in FIG. 3.

An alternative to the adjustment of the planetary rolls 6, 7 as shown in FIG. 3 is illustrated in FIG. 4. A still more effective adjustment of the spacing X is possible by means of dividing the segment into the segments 36, 37, each of which accommodates three planetary rolls. The two segments 36, 37 are pivotable about a center 38, which is arranged in an overlap region of said segments. Threaded spindles 39, 40 serve to pivot the segments 36, 37, each of said threaded spindles being rotatably articulated in a tongue attached to the segments 36, 37. The position of the threaded spindles 39, 40 is altered by means of a centrally arranged crank 48, whose rotational motion is transmitted, via sprocket wheels 47 and chains 43, 44, to the sprocket wheels 45, 46 connected to the threaded spindles 39, 40, said sprocket wheels 45, 46 being attached to the threaded spindles 39, 40 in a fixed location but rotatably. In order to create an adjustment motion of the segments 36, 37 different from one another, the thread pitch of the threaded spindles 39, 40 can be designed different from one another in order, for example, that the spacing X in the inlet 10 of the aggregate 3 can be adjusted faster than that in the region of the discharge 11. Alternatively to the solution illustrated in FIG. 4, a further possibility is to subdivide the segment into still more sections.

Figure 5:
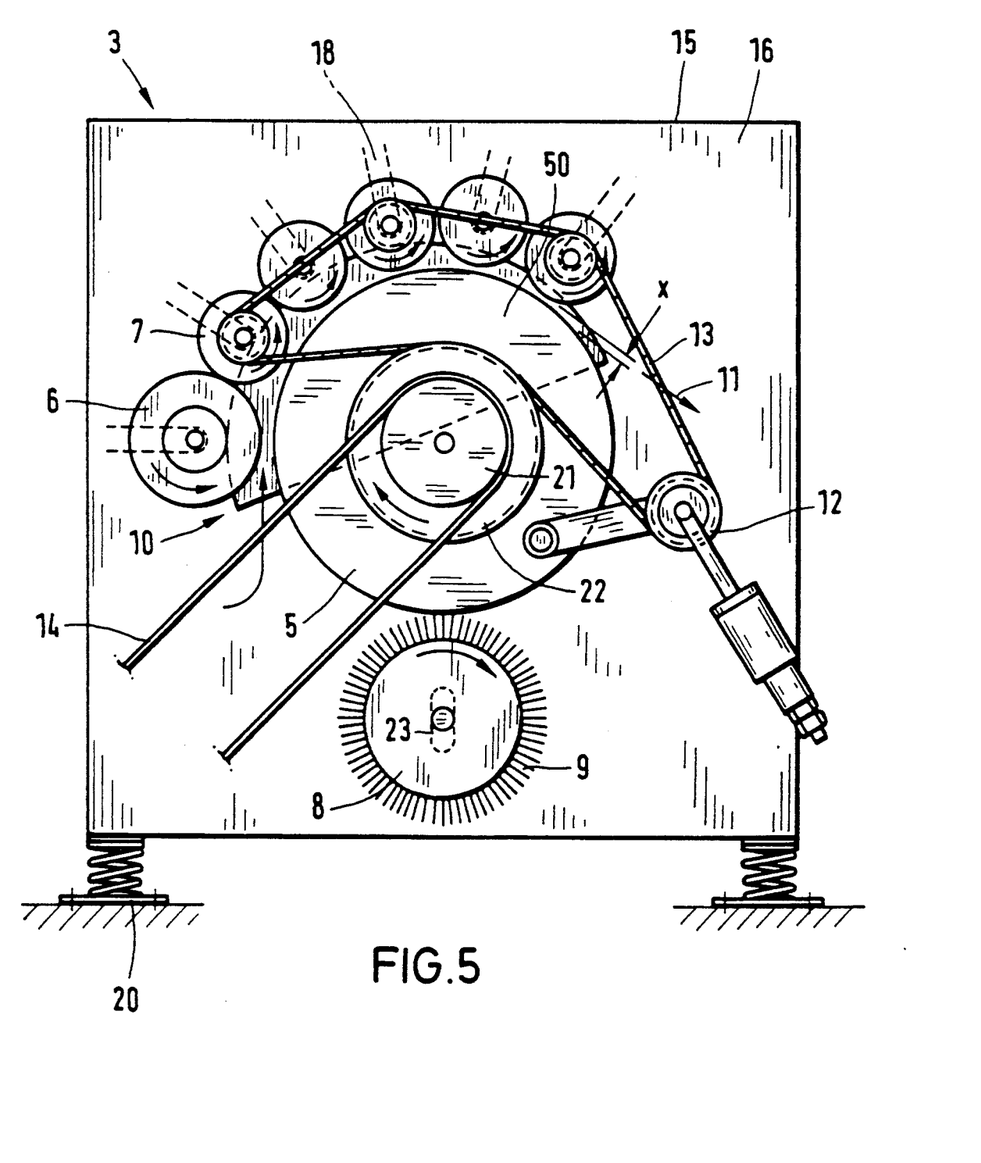
FIG. 5 shows the arrangement of a cam plate with which the planetary rolls are adjusted.

As shown in FIG. 5, the central adjustment of the planetary rolls 6, 7 is implemented by means of a cam plate 50. The cam plate 50 serves as a stop for the planetary rolls 6, 7, which are pressed in the direction of the central roll 5 by means of a pre-tensioned spring. By means of a rotation of the cam plate 50, whose radius is designed decreasing in the clockwise direction, the spacing X between the central roll and the planetary rolls 6, 7 can advantageously be adjusted in central fashion.

The embodiments of the invention in which an exclusive property or privilege is claimed are defined as follows:

1. A device in a grass-matting machine for breaking up straw material said device including an inlet (10) receiving cut straw material, an outlet (11) through which broken up straw material is discharged, a relatively large diameter central roll (5), a plurality of relatively small diameter planetary rolls (6, 7) spaced at predetermined radial distances from said central roll (5) and spaced at circumferentially spaced distances from one another around a portion of the circumference of said central roll (5) between said inlet (10) and said outlet (11), every other one of said planetary rolls having a drive wheel on its end at one lateral side of said machine and each of the other of said planetary rolls having a drive wheel on its end at the other lateral side of said machine, a drive (13, 14) operative to rotate said central and planetary rolls, said planetary rolls (6, 7) being rotated in a direction opposite to the direction in which said central roll is rotated, said drive including a first drive means in driving engagement with said drive wheels on said every other one of said planetary rolls and a second drive means in driving engagement with said drive wheels on said other of said planetary rolls, a brush roll (8) positioned below said central roll and a frame (15) including side walls (16, 17) supporting said rolls (6, 7) at their ends to thereby form an assembly, said planetary rolls having a surface structure matching the surface structure of said central roll.

2. The device of claim 1, wherein said central roll has a drive wheel on each of its opposite ends, said first drive means being in driven engagement with one of said drive wheels on said central roll and said second drive means being in driven engagement with the other of said drive wheels on said central roll.

3. The device of claim 2, wherein said first and second drive means are endless flexible drive means.

4. The device of claim 1 wherein said planetary rolls are all of equal diameter except the palentary roll nearest said inlet, said last mentioned planetary roll having a larger diameter than the diameter of the other planetary rolls.

5. The device of claim 4 wherein the peripheral speeds of all planetary rolls (6, 7) are equal.

6. The device of claim 1 wherein the peripheral speeds of the planetary rolls (6, 7) are progressively increasing from said inlet to said outlet.

7. The device of claim 1 and further comprising an adjusting mechanism operatively associated with said planetary rolls (6, 7) and operable to adjust the spacing (x) between said central roll (5) and said planetary rolls (6, 7) whereby the spacing adjustment is progressively less for said planetary rolls progressing from said inlet to said outlet.

8. The device of claim 7 wherein said adjusting mechanism includes an adjustment element operable to simultaneously adjust the spacing (x) of said planetary rolls (6, 7).

9. The device of claim 8 wherein said spacing adjustment is increased or decreased in accordance with increases or decreases, respectively, in the amount of straw material passing through said device.

10. The device of claim 7 and further comprising an elastic support for said frame (15).

11. The device of claim 7 wherein said planetary rolls (6, 7) are driven by variable tension drive belt.

12. The device of claim 7 wherein said spacing (x) between said central roll (5) and said planetary rolls (6, 7) is between 1 and 20 millimeter at the planetary roller (6) nearest the inlet (10) and between 0 and 5 millimeter at the planetary roller (7) nearest the outlet (11).

13. The device of claim 1 wherein the ratio between the peripheral speed of the central roll (5) and the peripheral speed of the planetary rolls is in the range between 1.1 to 1 and 2 to 1.

14. The device of claim 1 wherein said central roll (5) and said brush roll (8) have peripheral speeds between 5 and 35 meters per second.

15. The device of claim 1 wherein said central roll (5) and said planetary rolls (6, 7) have longitudinal fluting on their outer circumferences, said fluting having a pitch of 0.5 to 10 millimeter.

16. The device of claim 15 wherein said fluting is helical with a 0.1 to 20% twist.

17. The device of claim 16 wherein the profile angle of said fluting is between 35° and 90°.

18. The device of claim 17 wherein said fluting has knurling tips which are flattened at the fluting ends to a depth of between 0.1 and 5.0 millimeter.

19. The device of claim 1 wherein said side walls (16, 17) have recesses (18) extending radially toward the center of the central roll (5) for reception of said planetary rolls (6, 7).

20. The device of claim 1 wherein said brush roll (8) and said central roll (5) are driven in the same direction of rotation.

21. The device of claim 20 wherein said brush roll (8) has elastic brushes on its outer circumference.

22. The device of claim 20 wherein said brush roll (8) is adjustable relative to said central roll (5).

23. The device of claim 1 wherein said brush roll (8) performs the function of a stone guard.

24. The device of claim 1 wherein said brush roll (8) deflects upwardly the straw material delivered to said inlet (10).

25. The device of claim 1 wherein said planetary rolls (6, 7) may number as many as 10.

26. The device of claim 1 wherein said central roll (5) has a diameter between 200 millimeter and 900 millimeter and said planetary rolls (6, 7) have diameters between 50 millimeters and 400 millimeters with the central roll diameter being greater than the diameters of the planetary rolls.

27. A device in a grass-matting machine for breaking up straw material said device including an inlet (10) receiving cut straw material, an outlet (11) through which broken up straw material is discharged, a relatively large diameter central roll (5), a plurality of relatively small diameter planetary rolls (6, 7) spaced at predetermined radial distances from said central roll (5) and spaced at circumferentially spaced distances from one another around a portion of the circumference of said central roll (5) between said inlet (10) and said outlet (11), a drive (13, 14) operative to rotate said central and planetary rolls, said planetary rolls (6, 7) being rotated in a direction opposite to the direction in which said central roll is rotated, a brush roll (8) positioned below said central roll, said brush roll (8) and central roll (5) being driven in the same direction of rotation and said brush roll (8) deflecting upwardly the straw material delivered to said inlet (10) and cleaning straw material from the outer circumference of the central roll (5), and a frame (15) including side walls (16, 17) supporting said rolls (6, 7) at their ends to thereby form an assembly, said planetary rolls having a surface structure matching the surface structure of said central roll.

28. The device of claim 27 wherein said brush roll (8) performs the function of a stone guard.

* * * * *

UNITED STATES PATENT AND TRADEMARK OFFICE
CERTIFICATE OF CORRECTION

PATENT NO. : 5,326,319
DATED : July 5, 1994
INVENTOR(S) : Wilhelm von Allworden; Martin Hafele It is certified that error appears in the above-indentified patent and that said Letters Patent is hereby corrected as shown below:

Column 8, line 7, cancel "palentary" and substitute --planetary--.

Signed and Sealed this

Fourth Day of October, 1994

Attest:

BRUCE LEHMAN

*Attesting Officer*     *Commissioner of Patents and Trademarks*